United States Patent [19]

Grunke et al.

[11] Patent Number: 4,936,927
[45] Date of Patent: Jun. 26, 1990

[54] METHOD FOR APPLYING AN ALUMINUM DIFFUSION COATING TO A COMPONENT OF TITANIUM ALLOY

[75] Inventors: Richard Grunke, Munich; Lothar Piechl, Dachau, both of Fed. Rep. of Germany

[73] Assignee: MTU Motoren- und Turbinen-Union Muenchen GmbH, Munich, Fed. Rep. of Germany

[21] Appl. No.: 283,746

[22] Filed: Dec. 13, 1988

[30] Foreign Application Priority Data

Dec. 17, 1987 [DE] Fed. Rep. of Germany ....... 3742721

[51] Int. Cl.$^5$ ............................................. C23C 10/00
[52] U.S. Cl. ...................................... 148/13.1; 148/6; 148/421; 148/DIG. 33
[58] Field of Search ............... 148/DIG. 30, DIG. 33, 148/13.1, 133, 421.6, 781

[56] References Cited

U.S. PATENT DOCUMENTS

| | | | |
|---|---|---|---|
| 2,918,367 | 12/1959 | Crossley | 148/421 |
| 3,169,085 | 2/1965 | Newman | 148/421 |
| 3,408,236 | 10/1968 | Hartesveldt | 148/281 |
| 3,560,274 | 2/1971 | Ogden | 148/421 |
| 3,640,778 | 2/1972 | Winfree | 148/281 |
| 4,263,060 | 4/1981 | Gaucher | 148/281 |
| 4,465,524 | 8/1984 | Dearnaley | 148/421 |
| 4,478,648 | 10/1984 | Zeilinger | 148/281 |
| 4,624,714 | 11/1986 | Smickley | 148/421 |

FOREIGN PATENT DOCUMENTS

| | | | |
|---|---|---|---|
| 0555952 | 4/1958 | Canada | 148/281 |
| 0146875 | 1/1981 | Japan | 148/281 |
| 0870495 | 10/1981 | U.S.S.R. | 148/281 |

OTHER PUBLICATIONS

Pack-Aluminization of Titanium, by M. F. Galis, pp. 965–972.
Oxidation of Aluminide Coatings on Unalloyed Titanium by Roland Streiff et al., pp. 591–597.

Primary Examiner—Jay H. Woo
Assistant Examiner—Jeremiah F. Durkin, II
Attorney, Agent, or Firm—W. G. Fasse; D. H. Kane, Jr.

[57] ABSTRACT

Aluminum diffusion coatings are applied to structural components of titanium alloys by two separate heat treatment steps applied to the component embedded in an aluminum powder. The first heat treatment step is performed at relatively very low temperatures for avoiding an oxygen embrittlement of the structural component by any remainder oxygen. The subsequent diffusion heat treatment is performed at higher temperatures. If desired, a getter material having a high oxygen affinity, is added to the powder mixture in which the structural components are embedded for the first treatment. The getter material binds any remainder oxygen.

11 Claims, 3 Drawing Sheets

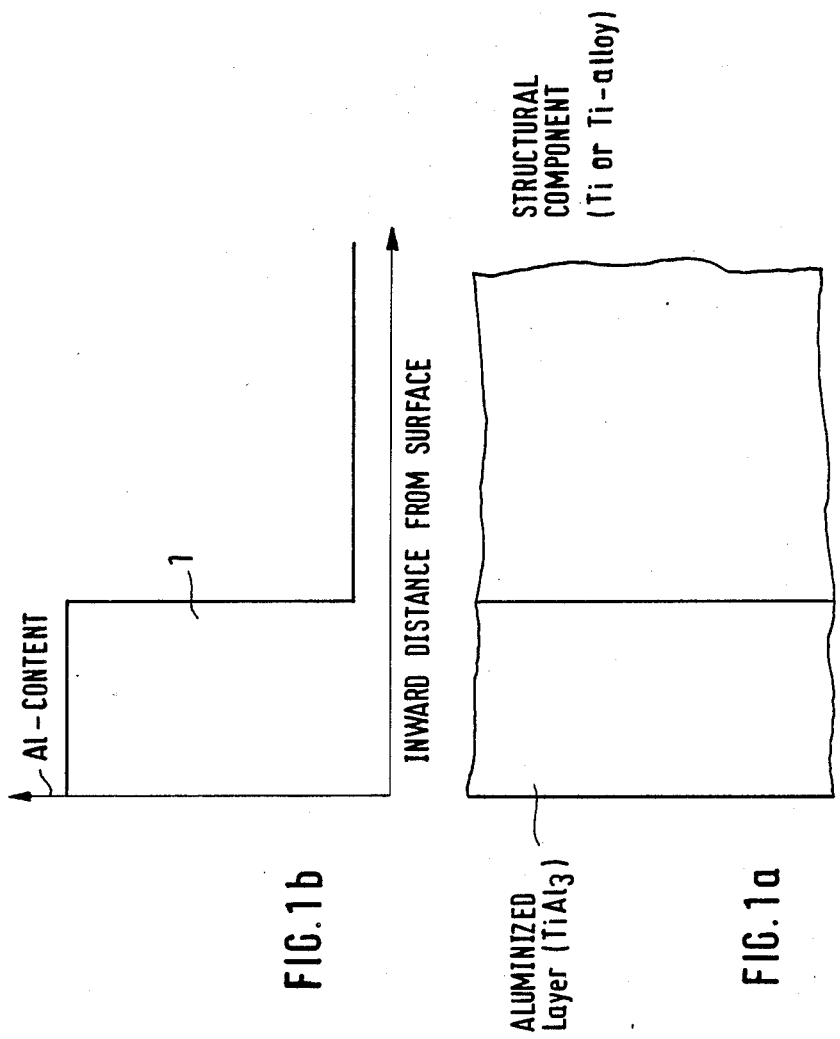

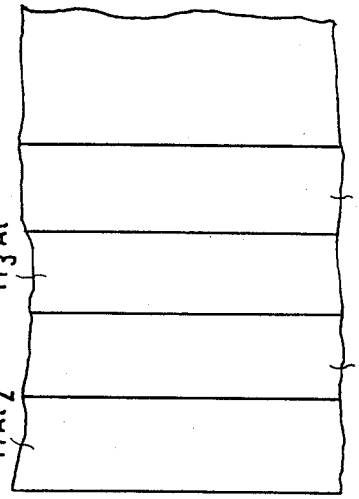

METHOD FOR APPLYING AN ALUMINUM DIFFUSION COATING TO A COMPONENT OF TITANIUM ALLOY

CROSS-REFERENCE TO RELATED APPLICATION

The present application is related to our copending application entitled: "METHOD FOR PRODUCING A LAYER PROTECTIVE AGAINST OXIDATION", filed simultaneously with the present application; U.S. Ser. No.: 07/283,745; Filing Date: Dec. 13, 1988.

FIELD OF THE INVENTION

The present invention relates to a method for applying an aluminum diffusion coating on the surfaces of titanium alloy components. Such coatings are applied by embedding the structural component to be coated in a powder bed or packing and then annealing the powder bed with the component under a protective gas atmosphere.

BACKGROUND INFORMATION

Titanium and titanium alloys are important structural materials in the aircraft power plant construction due to their advantageous strength to weight ratio. Such materials are used for components expected to operate at temperatures of up to about 550° C. Use of these components at higher temperatures is desirable, however, not possible due to the oxygen affinity of titanium alloys. Such affinity causes oxygen to diffuse into the surface of titanium alloys and the diffusion begins at about 550° C. to about 600° C., depending on the type of alloy. The results of such oxygen diffusion are surface areas which become brittle due to their having taken up oxygen. As a result, important mechanical characteristics of the titanium alloys are substantially impaired, for example, the vibration endurance limit is undesirably reduced.

An article entitled "Pack-Aluminization of Titanium", by M. F. Galis et al., available at the Titanium Conference in Munich, Federal Republic of Germany, and an article entitled "Oxidation of Aluminide Coatings on Unalloyed Titanium" by F. Streiff et al. and German Patent Publication No. DE-2,153,218 describe coating methods by means of which an economical diffusion coating is possible in order to introduce aluminum into areas close to the surface of the respective structural components.

According to these methods, the structural components to be coated are embedded in a powder packing comprising a filler material, for example, an aluminum oxide, a so-called donor such as aluminum, and a so-called activator such as $ALF_3$. The donor provides the element to be diffused into the structural component. If the element is aluminum, the donor is, as mentioned, powderized aluminum. The activator has two functions. First, it activates the surface by making it less passive with regard to the diffusion into the structural component to be coated. Second, the activator participates in the transport of the aluminum from the donor to the structural component surface. Once the structural component has been embedded in the powder packing, the packing with the component is introduced into an oven containing a protective gas atmosphere, for example argon, for the annealing treatment. During such treatment aluminum transported from the donor to the structural surface while halogenides are being produced. The aluminum diffuses into the titanium alloy to form a protective coating. As a rule, such coating comprises the intermetallic phase $TiAl_3$. The coating or diffusion temperature is within the range of about 800° C. to about 900° C. The coating duration will depend on the desired layer thickness. For typical layer thicknesses within the range of 2 to 50 μm. The duration is about 2 to 20 hours.

The above mentioned known methods have the disadvantage that in spite of the protective gas atmosphere, a small portion of remainder oxygen in the protective atmosphere in the oven or in the powder packing is technically unavoidable. As a result, during the annealing temperature treatment the oxygen causes a so-called oxygen brittleness in the surface zones close to the surface of the structural component being treated. The aluminum containing protective layer, especially as produced according to the above mentioned German Patent Publication (DE) 2,153,218 prevents the taking up of oxygen of the structural component during the operation of such component. However, the protective layer itself is brittle in the same way as a zone close to the surface which became brittle due to taking up oxygen. The protective layer contains mainly the intermetallic phase $TiAl_3$ but cannot prevent the just mentioned fact that it becomes itself brittle. This fact is problematic because the protective layer adheres to the surface of the structural component without transition so to speak. In other words, there is not gradual diminishing of the aluminum content as it diffuses into the material of the structural component. This jump in the aluminum content entails a respective jump in the material characteristics. For example, the modulus of elasticity, the so-called "E-modulus", and the ductility also have such a jump at the phase boundary between the protective coating and the material of the structural component. Such a characteristic is especially disadvantageous with regard to an incipient crack or fracture behavior of the component. As a result, the finished coated component is protected against oxygen brittleness, however, the coating method itself is an irreversible source of future impairment.

It is further possible that even though there is a jump type change in the alloy composition at the phase boundary between the protective coating and the base material of the component, a more steady or gradual transition appears or is presented due to stray effects in the analyzing method. Thus, such abrupt transition at the phase boundary may even be hard to detect.

Another typical disadvantage of known aluminizing methods is seen in the fact that a continuous decrease in the hardness is present in the direction from the surface inwardly toward the titanium or titanium alloy. This decrease in the hardness is typically not correlated to the concentration profiles of the elements in the coating. Such hardness characteristics which are independent of the content of the metallic elements, are typical for an oxygen embrittlement. The oxygen embrittled zone is located below the diffusion layer and the hardness gradually decreases in the direction toward the core of the structural component in accordance with the decreasing oxygen content. Such a hardness characteristic can also be achieved in that the titanium structural component is annealed in the presence of air without any technical diffusion treatment.

OBJECTS OF THE INVENTION

In view of the above it is the aim of the invention to achieve the following objects singly or in combination:

to provide a coating method for structural components made of titanium or titanium alloys in which aluminum is introduced into the zones of the structural component near the surface for protecting the component against oxygen embrittlement without causing any oxygen embrittlement by the coating method itself; and to provide a method for aluminizing titanium or titanium alloy components in such a way that a continuous or gradual decrease of the aluminum proportion in the layer is obtained to avoid a jump change in the material characteristics of such components.

SUMMARY OF THE INVENTION

The above objects have been achieved by subjecting the structural component to at least two separate heat treatment steps and, if desired, to a further intermediate temperature treatment step. More specifically, according to the invention, the structural component which has been embedded in a suitable powder mixture, for the aluminizing, is subjected to a first heat treatment step at temperatures within the range of about 400° C. to about 625° C. for such a duration that a coating or layer having a high aluminum content is formed to have a thickness of less than about 35μm. Preferably, the layer thickness is within the range of 0.1 to 2.0 μm and the first heat treatment takes about 0.5 to 5 hours. The subsequent heat treatment step takes place at temperatures of about 625° C. to 1400° C. to perform a diffusion annealing for durations in the range of 0.5 to 10 hours.

The method according to the invention has the advantage that due to the low temperature range of the first heat treatment step an oxygen embrittlement due to the remainder oxygen present in the treatment atmosphere is not possible. As a result, a layer is formed having a high aluminum content and comprising, as a rule, the intermetallic phase $TiAl_3$, whereby the aluminum content still decreases with a jump at the transition or boundary between the protective coating and the titanium or titanium alloy of the structural component. However, due to the second heat treatment step, the aluminum of the protective coating further diffuses into the material of the component so that the aluminum concentration in the surface zone is diminished by the aluminum travelling deeper into the structural component. Depending on the duration of the second heat treatment step, the diminishing of the aluminum in the surface zone may lead to a complete solid solution of the aluminum in the titanium or titanium alloy.

In the second heat treatment step, first intermetallic phases are formed with a lower aluminum content than the phase that has been formed in the first heat treatment step. The phase first formed is normally $TiAl_3$. The phases formed in the second step are, for example $TiAl_2$, $TiAl$, and $Ti_3Al$. When the annealing time for the second step is selected to be short, the intermetallic phases are only partially resolved. In this case one or several intermetallic phases and the Ti +Al mixed crystal are present simultaneously. The aluminum content thus diminishes in a stepwise manner from the surface in the direction toward the core of the structural component.

If the annealing time is sufficiently long, and if the protective layer thickness is small relative to the thickness of the structural component, aluminum will diffuse into the titanium or titanium alloy until all intermetallic phases are in solution and only a Ti +Al mixed crystal is present in the transition zone between the protective coating and the titanium or titanium alloy.

As a result of the two separate steps in the heat treatment as taught by the invention, a structural component made of titanium or titanium alloys is obtained having a protective layer rich in aluminum near the surface of the component wherein the aluminum is either partially bound in intermetallic phases and partially in solution in the crystal lattice of the titanium, or the aluminum is completely in such solution. In the latter case, no intermetallic phases of titanium and aluminum are present any more. Since the aluminum content decreases stepwise or steadily with an increasing depth into the structural component, an abrupt change in the material characteristics such as stiffness or ductility at the transition between the protective layer and the titanium or titanium alloy is prevented or at least substantially reduced.

If it is necessary to apply to the structural component a solution annealing, or an aging process, or a stress-free annealing, it is advantageous to perform these steps as an intermediate temperature treatment step subsequent to the first heat treatment step. In connection with the diffusion heat treatment step which is the above mentioned second heat treatment step, it is possible to use the solution annealing temperature of the titanium alloy. Stated differently, the intermediate temperature treatment step and the diffusion annealing or second heat treatment step can be performed as a single heat treatment operation. In this instance the invention achieves the further advantage that a final scouring step is avoided because the diffused aluminum prevents an oxygen embrittlement during the temperature treatment. Conventionally, a scouring operation for the removal of an embrittled surface layer zone could not be avoided because conventionally, the titanium or titanium alloy took up oxygen during the temperature treatment, such as solution annealing or aging because even in a technically feasible vacuum or protective gas there is still sufficient oxygen for the embrittlement to occur.

It is still another advantage of the invention that structural components treated as taught herein and which do not permit a scouring operation, such as compressor impeller blades, can now be subjected to any desired temperature treatment. According to another embodiment of the invention, the first heat treatment step is performed by varying the temperature as a function of time that is in accordance with a predetermined or given temperature time profile or characteristic, whereby the aluminum first diffuses into the structural component at a lower temperature of about 400° C. to about 625° C., whereupon, at the higher temperature, preferably above 625° C., the further coating takes place. As a result, aluminum is diffused into the structural component without any danger of an oxygen embrittlement at the lower temperature and such embrittlement is prevented at the subsequently applied higher temperature because the aluminum has already diffused into the structural component prior to the application of the higher temperature.

It has been found to be advantageous that the donor which supplies the element to be diffused in the structural component, is an aluminum alloy. An aluminum alloy produces a protective layer in which the aluminum content decreases continuously or in small steps from the surface inwardly toward the titanium or titanium alloy of which the structural component is made. When the donor is an aluminum alloy, one or several elements may be alloyed with the aluminum. These additional elements can also participate in the formation of the protective layer or coating.

An aluminum titanium alloy is advantageously used as the donor because the titanium in the donor alloy has practically no influence during the diffusion process on the titanium alloy of the structural component so that in the protective layer formation only the aluminum of the donor participates.

It has also been found to be advantageous to mix into the powder mixture in which the structural component is embedded, a material having a high oxygen affinity to function as a getter. This getter material should be finely and uniformly distributed throughout the volume of the powder packing or powder bed. The getter material is preferably used in the form of a powder or granular material or platelets or chips. Preferably or advantageously, the getter material has the same composition as the structural component to be coated. Thus, a getter material quite suitable for the present purpose is pure titanium or a titanium alloy since this material is capable of solving large quantities of oxygen. Moreover, the titanium or titanium alloy used as a getter material does not influence the titanium or titanium alloy of which the structural component is made. In other words, the getter material does not participate in any diffusion or alloy-up process or any other chemical reaction. The titanium is also relatively inexpensive, readily available, and easily handled.

By a fine and uniform distribution of the getter material throughout the volume of the powder bed, a large surface areas is provided for the getter material having the oxygen affinity, whereby this material is able to take up any remainder oxygen from the atmosphere in which the diffusion process is being performed. Thus, the oxygen is bound before it can diffuse into the relatively small surface of the structural component.

BRIEF DESCRIPTION OF THE DRAWINGS

In order that the invention may be clearly understood, it will now be described, by way of example, with reference to the accompanying drawings, wherein:

FIG. 1a is a simplified side view, on an enlarged scale, of a broken out portion of a structural component coated with a protective aluminized layer;

FIG. 1b is a diagram showing the aluminum content as a function of the inward distance from the surface of the aluminum coating in FIG. 1a;

FIG. 2a is a view similar to that of FIG. 1a, however illustrating the effect of a short duration diffusion annealing time;

FIG. 2b is a view similar to that of FIG. 1b, but illustrating the stepped diminishing of the aluminum content as the distance from the surface increases in accordance with FIG. 2a;

FIG. 3a is a view similar to that of FIG. 1a and illustrates the result of a long duration diffusion annealing time;

FIG. 3b is a view similar to that of FIG. 1b, and illustrates the gradual diminishing of the aluminum content as a result of a long duration diffusion annealing.

Figure 4:
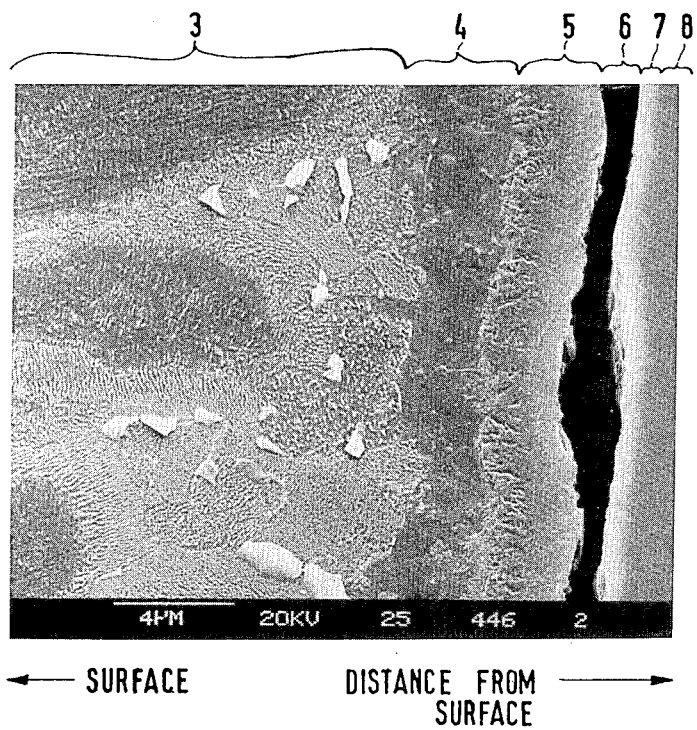
FIG. 4 is a polished section image or micrograph illustrating an aluminized, surface protecting layer.

DETAILED DESCRIPTION OF PREFERRED EXAMPLE EMBODIMENTS AND OF THE BEST MODE OF THE INVENTION

As shown in FIG. 1a the structural component of titanium or titanium alloy is provided on its surface with an aluminized layer of $TiAl_3$. The corresponding FIG. 1b shows that the aluminum content is high in the coating, but changes abruptly as shown at 1 to a much lower content at the transition boundary between the coating and the titanium or titanium alloy of the structural component. As explained above, the abrupt change in the aluminum content is undesirable because it may have corresponding abrupt changes in the material characteristics.

FIG. 2a illustrates a coating on a structural component which has been prepared as a result of a short duration diffusion treatment or diffusion annealing in which a number of layers having different intermetallic phases have been formed. For example, the outermost surface layer to the left in FIG. 2a is a $TiAl_2$ layer, the next layer inwardly is a TiAl layer. The third layer is a $Ti_3Al$ layer, and the fourth layer includes the titanium aluminum mixed crystal. As a result, the aluminum content diminishes from the outer surface inwardly in steps as shown at 2 in FIG. 2b.

FIG. 3 shows a layer formation as the result of a prolonged diffusion treatment. The layers near the surface as shown in FIG. 2a all went into solution and only a single titanium aluminum mixed crystal remains as the protective coating. FIG. 3b shows the gradual decrease of the aluminum content from the surface in the direction toward the center of the structural component. This gradual decrease is most desirable.

FIG. 4 shows a polished image of a micrograph illustrating a protective layer formed by aluminizing or alitizing in which the diffusion process was applied to an aluminum powder bed having an aluminum donor in the form of an aluminum alloy. The result is a stepwise diminishing of the aluminum content, whereby the steps 3, 4, 5, 6, and 7 become smaller and smaller from the outer surface inwardly.

Although the invention has been described with reference to specific example embodiments it will be appreciated that it is intended to cover all modifications and equivalents within the scope of the appended claims.

What we claim is:

1. A method for applying an aluminum diffusion coating to a titanium alloy component, comprising the following steps:
    (a) preparing an aluminum containing powder and embedding said titanium alloy component in said aluminum containing powder,
    (b) heating said component and said aluminum containing powder in a first heat treatment step to a first temperature within the range of about 400° C. to about 625° C. for a time duration sufficient to form an aluminum coating having a high aluminum content on said titanium alloy component and so that said coating attains a thickness of less than about 35 μm, and
    (c) performing a second heat treatment step for diffusion annealing said titanium alloy component with its aluminum coating, at a temperature within the range of about 625° C. to about 1400° C. for providing a gradual transition between said aluminum coating and said titanium alloy component.

2. The method of claim 1, further comprising performing an intermediate treatment step between said first heating step and said diffusion annealing second heating step for preparing said titanium alloy component with its aluminum coating for said second heat treatment step.

3. The method of claim 1, wherein said second heat treatment step for diffusion annealing is performed at a temperature corresponding to the solution heat treatment temperature of said titanium alloy within the range of 625° C. to 1400° C.

4. The method of claim 1, further comprising introducing into said aluminum containing powder an aluminum donor and an activator.

5. The method of claim 4, wherein said aluminum donor is an aluminum alloy.

6. The method of claim 4, wherein said aluminum donor is an aluminum titanium alloy.

7. The method of claim 1, further comprising adding to said aluminum containing powder, a getter material having a fine grain size and a high affinity to oxygen and intermixing the getter material with the aluminum containing powder to assure a uniform distribution of the getter material in the powder mixture.

8. The method of claim 7, wherein said getter material is added in the following forms selected from the group consisting of powder, granules, platelets, and chips.

9. The method of claim 7, wherein said getter material has a composition corresponding to that of said titanium alloy component.

10. The method of claim 7, wherein said getter material is selected from a group consisting of titanium, thorium, zirconium, silicon, calcium, strontium, barium, magnesium, and beryllium, and any of the alkaline earths.

11. The method of claim 2, wherein said diffusion annealing step and said intermediate temperature treatment step are performed simultaneously.

* * * * *

UNITED STATES PATENT AND TRADEMARK OFFICE
CERTIFICATE OF CORRECTION

PATENT NO. : 4,936,927

DATED : June 26, 1990

INVENTOR(S) : Richard Grunke et al.

It is certified that error appears in the above-identified patent and that said Letters Patent is hereby corrected as shown below:

ON TITLE PAGE:

Please replace "[75] Inventors:" to read:

--Richard Grunke, Muenchen;

Lothar Peichl, Dachau;

Heinrich Walter, Friedberg;

all three are of the Federal Republic of Germany.--

Signed and Sealed this

Fifth Day of May, 1992

Attest:

DOUGLAS B. COMER

Attesting Officer     Acting Commissioner of Patents and Trademarks